United States Patent Office 3,351,644
Patented Nov. 7, 1967

3,351,644
PREPARATION OF TELOMERIC ACID
FLUORIDES
Murray Hauptschein, Glenside, Pa., and Chester L. Parris, Morris Plains, N.J., assignors to Pennsalt Chemicals Corporation, Philadelphia, Pa., a corporation of Pennsylvania
No Drawing. Filed Oct. 15, 1963, Ser. No. 316,424
4 Claims. (Cl. 260—408)

This invention relates to the preparation of telomer acid fluorides from tetrafluoroethylene telomers.

This application is a continuation-in-part of prior copending applications Ser. No. 212,137, filed July 24, 1962, and Ser. No. 139,378, filed Sept. 20, 1961, of Murray Hauptschein and Chester L. Parris, entitled Preparation of Fluorinated Organic Compounds, both of said applications now being abandoned.

In recent years there has been a growing interest in telomers of highly fluorinated olefins, particularly telomers of tetrafluoroethylene and chlorotrifluoroethylene, as starting materials for the preparation of a variety of products having valuable and unique properties. Such telomer derived products, particularly those having relatively long chain lengths (e.g. a chain length of 6 carbons or more), have unique properties arising out of the extremely low surface energy of the highly fluorinated portion of the molecule. Thus, when a relatively long chain tetrafluoroethylene telomer is converted to a carboxylic acid, or salt, or similar derivative, high performance surfactants are obtained. Similarly, tetrafluoroethylene telomers provide starting materials for the preparation of polymers or copolymers containing relatively long chain perfluorinated alkyl side groups. When textiles, paper, leather or similar materials are coated with such polymers, the exposed fluorocarbon "tails" provide a surface of such low energy that they become both water and oil repellant.

A preferred procedure in the conversion of tetrafluoroethylene telomers to a desired derivative or intermediate involves, as a first step, the oxidation of the telomer end group to an acyl derivative, such as the carboxylic acid or carboxylic acid salt. A common technique for accomplishing this is to treat the telomer with fuming sulfuric acid. In previous experience, the major product, and in many cases the only product, from this reaction has been the carboxylic acid and/or the acid anhydride with very little or no yield of the acyl halide.

The conversion of the telomer predominately to the carboxylic acid rather than the acyl halide in these prior processes is disadvantageous in several respects. First of all, the acyl halide is often the more valuable product since it is a more versatile intermediate than the carboxylic acid. It is the intermediate of choice, for example, for production of amides, esters, and thiolesters. While the carboxylic acid may be converted to the acid halide, for example by treatment of the acid with phosphorous pentachloride, this involves an extra step and correspondingly increases the cost of acid halide end product.

The production of the carboxylic acid rather than the acyl halide is also disadvantageous because the acid is more difficult to recover from the crude reaction mixture. The acyl halides are more fluid than the acids which tend to have a syrupy consistency, and thus, the acid fluorides will separate more cleanly from the oleum as an immiscible phase that may be recovered by simple decantation. Furthermore, the acids are much higher boiling than the relatively volatile acyl halides which increases the difficulty of recovery by distillation particularly at higher molecular weights. Because of these difficulties, in the past it has been common practice to recover the telomer acids from the crude oleum mixture by diluting with water followed in some cases with neutralization with a base to form the acid salt after which the aqueous mixture is extracted with an organic solvent. Such procedures, as well as being tedious, are often unsatisfactory because of the strong tendency of the acid and its salts to form emulsions in aqueous systems particularly with relatively long chain compounds.

In accordance with the present invention, a highly convenient and economical method has been found for the conversion of perhalogenated tetrafluoroethylene telomers directly to acyl fluorides to provide a high purity product in excellent yields and conversions. The invention is based on the discovery that certain tetrafluoroethylene telomers, namely telomer iodides of the formula $R_f[CF_2CF_2]_nI$ where $R_f$ is a perfluoroalkyl or a monochloroperfluoroalkyl group and where $n$ is a small integer from 1 to about 8, may be reacted with fuming sulfuric acid under moderate conditions to produce the telomer acid fluoride, rather than the acid or other derivative, as the major product. The reaction proceeds in accordance with the following:

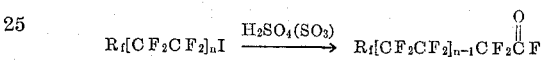

$$R_f[CF_2CF_2]_nI \xrightarrow{H_2SO_4(SO_3)} R_f[CF_2CF_2]_{n-1}CF_2\overset{O}{\overset{\|}{C}}F$$

The crude reaction product obtained, containing the acid fluoride as the major product, undergoes clean phase separation from the spent oleum following which the acid fluoride is obtained in substantially pure form by distilling the organic phase and recovering the acid fluoride as the distillate. Thus, in the process of the invention, not only is the valuable acyl fluoride produced as the major product of the reaction but in addition, it is simply and easily recovered from the reaction mixture in essentially pure form without the necessity of diluting with water or the use of extraction procedures as in the case of the carboxylic acids.

The precursor telomer iodides $R_f[CF_2CF_2]_nI$, where $R_f$ and $n$ are as previously defined, may be prepared in any desired manner. A preferred procedure for preparing these iodides is the reaction of a perfluoroalkyl iodide, or a monochloroperfluoroalkyl iodide with tetrafluoroethylene. The telomerization reaction proceeds readily under super-atmospheric pressures and temperatures ranging from about 150° to 300° C. and reaction periods of e.g. from ½ to 50 hours. A mixture of compounds is generally produced containing varying numbers of tetrafluoroethylene units linked to one another in a straight chain. If desired, the process of the invention may be applied to these mixtures in which case a mixture of acyl fluorides of varying chain length is produced, or individual iodides may first be separated from the initial mixture of telomers, and these individuals converted to acyl fluorides by the method of the invention. A particularly preferred method for producing precursor telomer iodides is described in copending application Ser. No. 82,701, filed Jan. 16, 1961, of Hauptschein et al., now U.S. Patent 3,156,732, issued Nov. 10, 1964, wherein secondary perfluorinated or monochloroperfluorinated iodides are employed as telogens for telomerization with tetrafluoroethylene to produce telomer iodides having narrow ranges of molecular weights.

The preferred starting telomer iodides are those in which $n$ is an integer from 1 to about 6 and where the radical $R_f$ (which may be straight or branched chain) contains from 1 to 6 and most desirably from 1 to 4 carbon atoms. Particularly preferred are those iodides containing in the molecule as a whole from 7 to 15 carbon atoms since the acid fluorides obtained therefrom have very little solubility in the oleum and thus can be separated almost quantitatively from the oleum by simple decantation procedures.

Typical examples of suitable precursor iodides and the corresponding acid fluoride that may be obtained therefrom by the method of the invention are the following:

| Precursor Iodide | Acyl fluoride |
|---|---|
| $CF_3CF(CF_3)[CF_2CF_2]_3I$ | $CF_3CF(CF_3)[CF_2CF_2]_2CF_2COF$ |
| $CF_2ClCF(CF_3)[CF_2CF_2]_2I$ | $CF_2ClCF(CF_3)CF_2CF_2CF_2COF$ |
| $CF_3CF(CF_3)[CF_2CF_2]_nI$ (mixture where n ranges from 2-5) | $CF_3CF(CF_3)[CF_2CF_2]_{n-1}CF_2COF$ (mixture where n ranges from 2-5) |
| $CF_2ClCF(CF_3)[CF_2CF_2]_nI$ (mixture where n ranges from 2-5) | $CF_2ClCF(CF_3)[CF_2CF_2]_{n-1}CF_2COF$ (mixture where n ranges from 2-5) |
| $CF_3[CF_2CF_2]_4I$ | $CF_3[CF_2CF_2]_3CF_2COF$ |
| $CF_3CF_2CF(CF_3)[CF_2CF_2]_2I$ | $CF_3CF_2CF(CF_3)CF_2CF_2CF_2COF$ |
| $CF_2ClCF(CF_3)CF_2CF(CF_3)[CF_2CF_2]_2I$ | $CF_2ClCF(CF_3)—CF_2CF(CF_3)CF_2CF_2CF_2COF$ |
| $CF_2ClCF(CF_3)[CF_2CF_2]_5I$ | $CF_2ClCF(CF_3)[CF_2CF_2]_4CF_2COF$ |
| $CF_3CF(CF_3)[CF_2CF_2]_4I$ | $CF_3CF(CF_3)[CF_2CF_2]_3CF_2COF$ |

To produce the telomer acid fluoride as the major product of the reaction between the telomer iodide and the fuming sulfuric acid, it has been discovered that certain ranges of reaction temperature and $SO_3$ concentration must be employed, and that in addition, the reaction time must be properly chosen in relation to the other reaction variables, particularly temperature, in order to prevent the conversion of the acid fluoride once it has been formed to the carboxylic acid or other by-products.

The reaction temperature should range from about 120 to 250° C. At temperatures greater than 250° C., it becomes difficult to avoid the formation of acid and other by-products, while at temperatures below about 120° C. the reaction does not proceed at a practicable rate. Temperatures of from 130 to 200° C. are preferred not only from the standpoint of affording good yields and conversions to acid fluoride at practicable reaction times but also because in this temperature range the reaction pressures are moderate and the fuming sulfuric acid reagent less corrosive.

The concentration by weight of $SO_3$ in the fuming sulfuric acid [$H_2SO_4(SO_3)$] should be in the range of about 20% to 65% and preferably from 25% to 45%. At $SO_3$ concentrations lower than about 20%, the yields of acid fluoride are materially decreased in favor of the corresponding carboxylic acid. At $SO_3$ concentrations over about 70%, the yield of acid fluoride is lowered due to the formation of by-product sulfur compounds. High $SO_3$ concentrations are further undesirable from the standpoint of ease of operation; at high $SO_3$ concentrations higher reaction pressures are required and the presence of solids complicates the recovery of the desired products from the reaction mixture.

The reaction time is a critical factor in determining the yield of telomer acid fluoride. It has been found that the acid fluoride, once formed, tends to undergo further reaction and is converted to the acid and/or other by-products. Thus, having once formed the acid fluoride, it is necessary to discontinue the reaction to avoid its further reaction and conversion to other products. In general, the higher the temperature, the higher the rate at which the conversion of the telomer acid fluoride occurs and accordingly as the reaction temperature is increased, the reaction time must be correspondingly decreased. thus, while a reaction time as long as about 24 hours may be suitable at low reaction temperatures, at relatively high temperature, the reaction time may be as little as ¼ hour to obtain the desired acid fluoride as the major product. In the preferred range of reaction temperature of from 130° C. to 200° C., a reaction time of from 1 to about 20 hours will generally be found most suitable.

In addition to the influence of temperature, the choice of reaction time to produce the telomer acid fluoride as the major product will also be influenced by the type of agitation used to bring the reactants into intimate contact with one another. As the intimacy of contact between the reactants is increased, correspondingly shorter reaction periods should be used to avoid conversion of the telomer acid fluoride once formed into other products. The molecular weight of the telomer iodide is also a factor. Higher molecular weight telomers in general react more slowly such that longer reaction periods are permissible.

In any particular case, the extent to which the reaction should be carried in order to produce the telomer acid fluoride as the major product can be readily determined by empirical observation guided by the above considerations. In the examples which follow, the proper correlation of reaction temperature, time and other variables to produce the telomer acid fluoride as the major product is illustrated for a number of starting iodides under varying reaction conditions.

The molar ratio of fuming sulfuric acid to the telomer iodide is not sharply critical. However, to insure high conversions of the telomer iodide, the molar ratio of fuming sulfuric acid (based on the $SO_3$ content) to the iodide should be in excess of 1:1 and preferably from 2:1 to 15:1.

Aside from the necessity of maintaining the reactants in the liquid phase, reaction pressure is not critical. In some cases, where the telomer iodide is relative non-volatile and where the reaction temperature and concentration of $SO_3$ is relatively low, the reaction may be carried out conveniently at atmospheric pressure. Where it is carried out under somewhat more vigorous conditions (i.e. higher concentrations of $SO_3$ and/or higher temperatures) or when relatively volatile telomer iodides are employed, moderate super-atmospheric pressures ranging e.g. up to 2000 p.s.i.g. may be necessary to maintain the reactants in the liquid phase.

Following the reaction of the telomer iodide with the fuming sulfuric acid producing the acid fluoride as the major product, the reaction mixture, generally containing a relatively large excess of oleum, is permitted to separate into two immiscible phases, an inorganic phase, consisting essentially of the spent oleum, and an organic phase consisting principally of telomer acid fluoride and unreacted iodide, and containing relatively small amounts of by-product carboxylic acid and/or other by-products. The two immiscible phases may be separated cleanly from one another by simple decantation. The oleum may if desired be treated by the addition of $SO_3$ to bring it up to the proper strength whereupon it is suitable for reuse.

To recover the acid fluoride in substantially pure form, the organic phase is simply distilled whereupon the more volatile acid fluoride separates from the unreacted telomer iodide and the relatively small amounts of by-product acid and/or other organic by-products, and is recovered as the distillate. Unreacted telomeriodide may be recycled for further reaction with fuming sulfuric acid, while the organic by-products, if any, may be separately recovered.

The following examples illustrate several specific embodiments of the invention:

EXAMPLE 1.—PREPARATION OF $$CF_2ClCF(CF_3)[CF_2CF_2]_2CF_2\overset{O}{\underset{\|}{C}}F$$

FROM $$CF_2ClCF(CF_3)[CF_2CF_2]_3I$$

A 1 gallon stainless steel autoclave equipped with a turbine type agitator is charged with 612 grams of the telomer iodide $$CF_2ClCF(CF_3)[CF_2CF_2]_3I$$

and 1800 grams of fuming sulfuric acid containing 35% by weight of $SO_3$. The autoclave is sealed and heated with stirring at a stirrer speed of 600 r.p.m. at a temperature of 135° C. for 3 hours. The autoclave is cooled and the contents emptied by means of a dip pipe. The product separates cleanly into two immiscible phases, an inorganic phase consisting essentially of spent oleum and an organic phase. The spent oleum is decanted off and the organic product weighing 487 grams is collected. The organic product is vacuum distilled and 366 grams (88% yield) is collected as distillate consisting essentially of pure telomer acid fluoride $$CF_2ClCF(CF_3)[CF_2CF_2]_2CF_2\overset{O}{\underset{\|}{C}}F$$

boiling at 77° C. at 50 mm. Hg. The total conversion of the telomer iodide is 85%. In addition to the acid fluoride there is obtained in the residue of the distillation only 1.8% yield of the much higher boiling telomer acid of the formula $$CF_2ClCF(CF_3)[CF_2CF_2]_2CF_2COOH$$

(B.P. 124° C. at 14 mm. Hg and 2.7% of the telomer fluorosulfate $$CF_2ClCF(CF_3)[CF_2CF_2]_3OSO_2F$$

with a total by-product yield of only 4.5%.

EXAMPLE 2.—PREPARATION OF $$CF_2ClCF(CF_3)[CF_2CF_2]_2CF_2\overset{O}{\underset{\|}{C}}F$$

FROM $$CF_2ClCF(CF_3)[CF_2CF_2]_3I$$

Example 1 is repeated with all conditions unchanged except that the temperature is raised from 135° C. to 145° C. From this reaction there is obtained a slightly lower yield (viz, 86.3%) of the telomer acid fluoride and a slightly increased yield (viz. 6.8%) of the telomer carboxylic acid. The total conversion of the telomer iodide is increased from 85% to 97%.

EXAMPLE 3.—PREPARATION OF $$(CF_3)_2CF[CF_2CF_2]_3CF_2\overset{O}{\underset{\|}{C}}F$$

FROM $$(CF_3)_2CF[CF_2CF_2]_3I$$

Example 1 is repeated keeping all conditions the same except that the starting telomer iodide is $$(CF_3)_2CF[CF_2CF_2]_3I$$

and the temperature is raised from 135° C. to 165° C. and the reaction time shortened from 3 hours to 2 hours. From this reaction there is obtained a 73.8% yield of the acid fluoride $$(CF_3)_2CF[CF_2CF_2]_3CF_2\overset{O}{\underset{\|}{C}}F$$

B.P. 69° C. at 80 mm. Hg and a 17.6% yield of the telomer acid $(CF_3)_2CF[CF_2CF_2]_2CF_2COOH$, B.P. 115° C. at 20 mm. Hg. The total conversion of the telomer iodide is 99.8%.

EXAMPLE 4.—PREPARATION OF $$(CF_3)_2CF[CF_2CF_2]_3CF_2\overset{O}{\underset{\|}{C}}F$$

FROM $$(CF_3)_2CF[CF_2CF_2]_4I$$

A 1 gallon stainless steel autoclave equipped with a turbine type agitator is charged with 600 grams (0.862 mole) of the telomer iodide $(CF_3)CF[CF_2CF_2]_4I$ and 1800 grams of fuming sulfuric acid containing 35% by weight of $SO_3$. The autoclave is sealed and heated with stirring at a speed of 600 r.p.m. at a temperature of 165° C. for 2 hours. The autoclave is cooled and the contents emptied. The reaction mixture separates cleanly into two immiscible phases; the lower layer of spent oleum is removed leaving 483 grams of organic product. The organic product is vacuum distilled and there is obtained 390 grams of distillate (86.5% yield) consisting essentially of pure telomer acid fluoride $$(CF_3)_2CF[CF_2CF_2]_3CF_2\overset{O}{\underset{\|}{C}}F$$

boiling at 86° C. at 30 mm. Hg. The overall conversion of the telomer iodide is 92.4%. In addition to the acid fluoride the residue of the distillation contains only a 6.2% yield of the much higher boiling telomer acid $(CF_3)CF[CF_2CF_2]_3CF_2COOH$ (B.P. 125° C. at 10 mm. Hg) and a 2.5% yield of the telomer fluorosulfate $$(CF_3)_2CF[CF_2CF_2]_4OSO_2F$$

EXAMPLE 5.—PREPARATION OF $$(CF_3)_2CF[CF_2CF_2]_3CF_2\overset{O}{\underset{\|}{C}}F$$

FROM $$(CF_3)_2CF[CF_2CF_2]_4I$$

Example 4 is repeated keeping all conditions the same except that the temperature is raised from 165° C. to 173° C. The yield of acid fluoride is decreased slightly from 86.5% to 82.5% while the yield of the telomer acid increases slightly from 6.2% to 8.7%. The overall conversion of the telomer iodide is increased to 97%.

EXAMPLE 6.—PREPARATION OF $$(CF_3)_2CF[CF_2CF_2]_4CF_2\overset{O}{\underset{\|}{C}}F$$

FROM $$(CF_3)_2CF[CF_2CF_2]_5I$$

A 1 gallon stainless steel autoclave equipped with a turbine type agitator is charged with 562 grams of the telomer iodide $(CF_3)_2CF[CF_2CF_2]_5I$ together with 1800 grams of fuming sulfuric acid containing 35% by weight $SO_3$. The autoclave is sealed and heated with stirring at a speed of 600 r.p.m. at 178° C. for 1.5 hours. The autoclave is cooled to 60° C. and the contents emptied by means of a dip pipe. On further cooling, the organic product solidifies, permitting the spent oleum to be decanted off leaving 503 grams of organic product. The solid is dissolved in 700 grams of 1,1,2-trichlorotrifluoroethane and residual oleum removed by phase separation. After stripping off the solvent, the organic product is vacuum distilled and a distillate is obtained weighing 326 grams (92% yield) and consisting essentially of pure telomer acid fluoride $$(CF_3)_2CF[CF_2CF_2]_4CF_2\overset{O}{\underset{\|}{C}}F$$

having a boiling point of 88° C. at 7 mm. Hg. The total conversion of telomer iodide is 79%. In addition to the telomer fluoride there is obtained in the residue of the distillation only a 4.1% yield of the much higher boiling telomer acid $(CF_3)_2CF[CF_2CF_2]_4CF_2COOH$ (B.P. 117°

C. at less than 1 mm. Hg) and a 2.3% yield of the telomer fluorosulfate $(CF_3)_2CF[CF_2CF_2]_5OSO_2F$.

In the following examples (7 to 15), a shaking autoclave is used instead of the high speed stirrer equipped autoclave of Examples 1–6. Because of the poorer contact between the reactants, longer reaction periods are employed.

EXAMPLE 7.—PREPARATION OF $$CF_2ClCF(CF_3)[CF_2CF_2]_2CF_2C(O)F$$

FROM $$CF_2ClCF(CF_3)[CF_2CF_2]_3I$$

A 1000 milliliter stainless steel autoclave is charged with 800 grams of fuming sulfuric acid containing 30% by weight of $SO_3$, and 200 grams of the telomer iodide $$CF_2ClCF(CF_3)[CF_2CF_2]_3I$$

The autoclave is heated with shaking of 20 hours at a reaction temperature of 135° C. The autoclave is cooled and opened and the contents transferred to a separatory funnel whereupon the oleum and organic product cleanly separate into two immiscible phases. The organic product weighing 152 grams is vacuum distilled. There is collected as distillate 103 grams (63% yield) of the telomer acid fluoride $$CF_2ClCF(CF_3)[CF_2CF_2]_2CF_2C(O)F$$

The residue from the distillation weighing 45.7 grams consists almost entirely of a mixture of higher boiling telomer acid $$CF_2ClCF(CF_3)[CF_2CH_2]_2CF_2COOH$$

and its anhydride in a yield of about 24%.

EXAMPLE 8.—PREPARATION OF $$CF_2ClCF(CF_3)[CF_2CF_2]_2CF_2C(O)F$$

FROM $$CF_2ClCF(CF_3)[CF_2CF_2]_3I$$

Example 7 is repeated under the same conditions except that the reaction time is increased from 20 hours to 48 hours. There is obtained from this reaction a yield of acid fluoride of only 17% while the yield of telomer acid and its anhydride is increased to 65%. In this example, most of the acid fluoride, after being formed, is converted to the acid and/or its anhydride by prolonging the period of reaction.

EXAMPLE 9.—PREPARATION OF $$CF_2ClCF(CF_3)[CF_2CF_2]_3CF_2C(O)F$$

FROM $$CF_2ClCF(CF_3)[CF_2CF_2]_4I$$

A 1000 milliliter stainless steel autoclave is charged with 800 grams of fuming sulfuric acid containing 30% by weight of $SO_3$ and 356.2 grams (0.5 mole) of the telomer iodide $$CF_2ClCF(CF_3)[CF_2CF_2]_4I$$

The autoclave is heated with shaking at a temperature of 150° C. for 20 hours. The autoclave is cooled, opened and the contents poured into a separatory funnel whereupon the oleum and the organic product separate cleanly into two immiscible phases. The organic phase is removed and vacuum distilled. There is obtained 127 grams of distillate (66% yield) consisting essentially of pure telomer acid fluoride of the formula $$CF_2ClCF(CF_3)[CF_2CF_2]_3CF_2C(O)F$$

boiling at 99° C. at 29 mm. Hg. The residue, weighing 183 grams consists of 144 grams of the higher boiling unreacted telomer iodide (B.P. 128° C. at 20 mm. Hg) and 39 grams (25% yield) of the still higher boiling telomer acid of the formula $$CF_2ClCF(CF_3)[CF_2CF_2]_3CF_2COOH$$

(B.P. 141° C. at 8 mm. Hg).

EXAMPLE 10.—PREPARATION OF $$CF_2ClCF(CF_3)[CF_2CF_2]_2CF_2C(O)F$$

FROM $$CF_2ClCF(CF_3)[CF_2CF_2]_3I$$

A 1400 milliliter stainless steel autoclave is charged with 900 grams of fuming sulfuric acid containing 35% by weight of $SO_3$ and 300 grams (0.49 mole) of the telomer iodide $$CF_2ClCF(CF_3)[CF_2CF_2]_3I$$

The autoclave is sealed and heated with shaking at 135° C. for 8 hours. The autoclave is then cooled to room temperature, opened, and the contents transferred to a separatory funnel while carefully excluding moisture from the product. The reaction mixture separates cleanly into a lower oleum phase and an upper organic phase. The two phases are separated cleanly and the organic phase weighing 246 grams is vacuum distilled; 150 grams of distillate is obtained consisting essentially of pure telomer acid fluoride $$CF_2ClCF(CF_3)[CF_2CF_2]_2CF_2C(O)F$$

boiling at 77° C. at 50 mm. Hg, a yield of 84%. The residue from the distillation consists of 70 grams of the much higher boiling unreacted telomer iodide, 17 grams (9.4% yield) of the still higher boiling telomer acid $$CF_2ClCF(CF_3)[CF_2CF_2]_2CF_2COOH$$

(B.P. 124° C. at 14 mm. Hg) and 3.5 grams (1.6% yield) of the telomer fluorosulfate $$CF_2ClCF(CF_3)[CF_2CF_2]_3OSO_2F.$$

EXAMPLE 11.—PREPARATION OF $$(CF_3)_2CF[CF_2CF_2]_2CF_2C(O)F$$

FROM $$(CF_3)_2CF[CF_2CF_2]_3I$$

Example 10 is repeated under the same conditions except that the starting iodide is $(CF_3)_2CF[CF_2]_3I$ and the reaction time is increased from 8 to 16 hours. In this reaction there is obtained a yield of the telomer acid fluoride $$(CF_3)_2CF[CF_2CF_2]_2CF_2C(O)F$$

boiling at 69° C. at 80 mm. Hg of 73.5% and a yield of the telomer acid $(CF_3)_2CF[CF_2CF_2]_2CF_2COOH$ boiling at 115° C. at 20 mm. Hg of 18.8%.

EXAMPLE 12.—PREPARATION OF

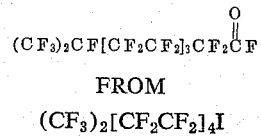

FROM $(CF_3)_2[CF_2CF_2]_4I$

A 1400 milliliter stainless steel autoclave is charged with 900 grams of fuming sulfuric acid containing 35% by weight of $SO_3$ and 278 grams (0.4 mole) of the telomer iodide $(CF_3)_2CF[CF_2CF_2]_4I$. The autoclave is sealed and heated with shaking at 150° C. for 16 hours, after which it is cooled to room temperature, opened, and the contents transferred to a separatory funnel while carefully excluding moisture from the product. The reaction mixture separates cleanly into a lower oleum phase and an upper organic phase. On separation of the two phases, the organic phase is vacuum distilled and there is collected as distillate 178.4 grams (80% yield) of the acid fluoride

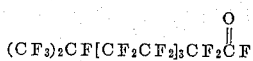

having a boiling point of 86° C. at 30 mm. Hg. The residue consists almost entirely of 38 grams (17% yield) of the much higher boiling telomer acid $(CF_3)_2CF[CF_2CF_2]_3COOH$ having a boiling point of 125° C. at 10 mm. Hg and about 5 grams (2% yield) of the telomer fluorosulfate $(CF_3)_2CF[CF_2CF_2]_4OSO_2F$.

EXAMPLE 13.—PREPARATION OF

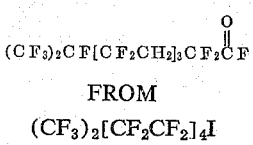

FROM $(CF_3)_2[CF_2CF_2]_4I$

Example 12 is repeated under the same conditions except that the reaction temperature is increased from 150° to 160° C. The yield of telomer acid fluoride decreases from 80% to 63.7% while the yield of telomer acid increases from about 17% to 29%.

EXAMPLE 14.—PREPARATION OF

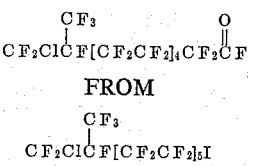

FROM

A 1400 milliliter stainless steel autoclave is charged with 325 grams (0.4 mole) of the telomer iodide $$CF_2ClCF(CF_3)[CF_2CF_2]_5I$$

and 900 grams of fuming sulfuric acid containing 35% $SO_3$. The autoclave is sealed and heated with shaking at 160° C. for 20 hours. The autoclave is cooled, opened, and the contents poured into a glass container. The layer of spent sulfuric acid is decanted from the solidified organic product which weighs 289.5 grams. Upon vacuum distillation of the organic product, there is obtained a distillate weighing 109 grams (71% yield) and consisting essentially of pure telomer acid fluoride

having a boiling point of 98° C. at 5 mm. Hg. The residue from this distillation consists of 142 grams of the higher boiling unreacted telomer iodide (B.P. 130° C. at 5 mm. Hg) and 29 grams (19% yield) of the still higher boiling telomer acid

(B.P. 117° C. at 0.1 mm. Hg) and 3 grams (1.7% yield) of the telomer fluorosulfate

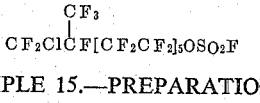

EXAMPLE 15.—PREPARATION OF

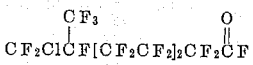

from

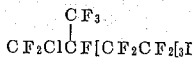

A 1400 milliliter stainless steel autoclave is charged with 900 grams of fuming sulfuric acid containing 40% by weight of $SO_3$ and 300 grams (0.49 mole) of the telomer iodide

The autoclave is sealed and heated with shaking at 135° C. for 6 hours. The autoclave is then cooled to room temperature, opened, and the contents transferred to a separatory funnel while carefully excluding moisture from the product. The reaction mixture separates cleanly into a lower oleum phase and an upper organic phase. After carefully separating the phases, the organic phase weighing 241 grams is vacuum distilled. There is collected as distillate 125 grams (82.7% yield) of the telomer acid fluoride

boiling at 77° C. at 50 mm. Hg. The residue from this reaction consists of 108 grams of the higher boiling unreacted telomer iodide (B.P. 99° C. at 20 mm. Hg) about one gram (less than 1% yield) of the telomer acid

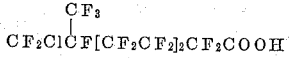

and 3 grams (1.6% yield) of the telomer fluorosulfate

We claim:

1. A method for the production of tetrafluoroethylene telomer acid fluorides which comprises the steps of reacting a tetrafluoroethylene telomer iodide of the formula $R_f[CF_2CF_2]_nI$ where $n$ is a small integer from 1 to about 8 and where $R_f$ is selected from the class consisting of perfluoroalkyl and ω-monochloroperfluoroalkyl radicals with fuming sulfuric acid containing from about 20% to 65% by weight of $SO_3$ at a temperature of from 130 to 200° C. and for a reaction time of from 1 to 20 hours, the shorter of said reaction times being employed at the higher temperatures in said range, thereby producing a telomer acid fluoride of the formula

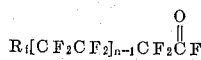

as the major product of the reaction, discontinuing said reaction after the formation of said acid fluoride to avoid conversion thereof to other products, permitting said reaction product to separate into an inorganic phase consisting essentially of fuming sulfuric acid, and an organic phase containing said acid fluoride, and then recovering said acid fluoride.

2. A method for the production of telomer acid fluorides which comprises the steps of reacting a tetrafluoroethylene telomer iodide of the formula $$R_f[CF_2CF_2]_nI$$

where $n$ is a small integer from 1 to about 8 and where $R_f$ is selected from the class consisting of perfluoroalkyl and ω-monochloroperfluoroalkyl radicals with an excess of fuming sulfuric acid containing from about 20% to 65% by weight $SO_3$ at a temperature of from 130° to 200° C., and for a reaction time of from 1 to 20 hours, the shorter of said reaction times being employed at the higher temperatures in said range, thereby producing a telomer acid fluoride of the formula $$R_f[CF_2CF_2]_{n-1}CF_2\overset{O}{\overset{\|}{C}}F$$

as the major product of the reaction, discontinuing said reaction after the formation of said acid fluoride to avoid the conversion thereof to other products, permitting said reaction product to separate into an inorganic phase consisting essentially of fuming sulfuric acid, and an organic phase containing said acid fluoride, and then recovering the more volatile acid fluoride from the organic phase by distilling said organic phase and recovering acid fluoride as distillate.

3. A method in accordance with claim 1 in which said starting iodides contain from 7 to 15 carbon atoms in the molecule.

4. A method in accordance with claim 1 in which said fuming sulfuric acid contains from about 25% to 45% by weight of $SO_3$.

References Cited

UNITED STATES PATENTS 2,904,567  9/1959  Barnhart et al. _____ 260—408

OTHER REFERENCES

Simons: "Flourine Chemistry," Academic Press Inc., New York, vol. II (1954), pp. 364 and 367.

NICHOLAS S. RIZZO, *Primary Examiner.*

C. PARKER, *Examiner.*

R. GALLAGHER, A. SUTTO, *Assistant Examiners.*